No. 893,554. PATENTED JULY 14, 1908.
F. C. ST. ONGE.
HOSE COUPLING.
APPLICATION FILED MAR. 29, 1907.
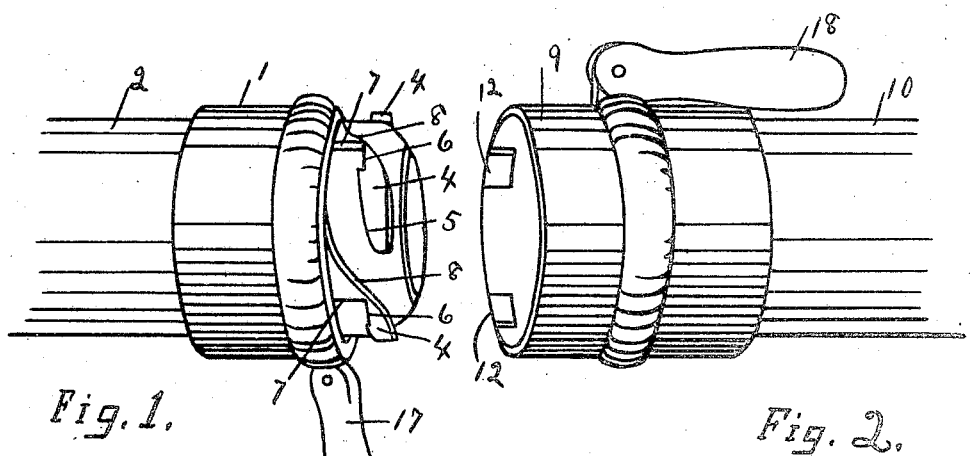
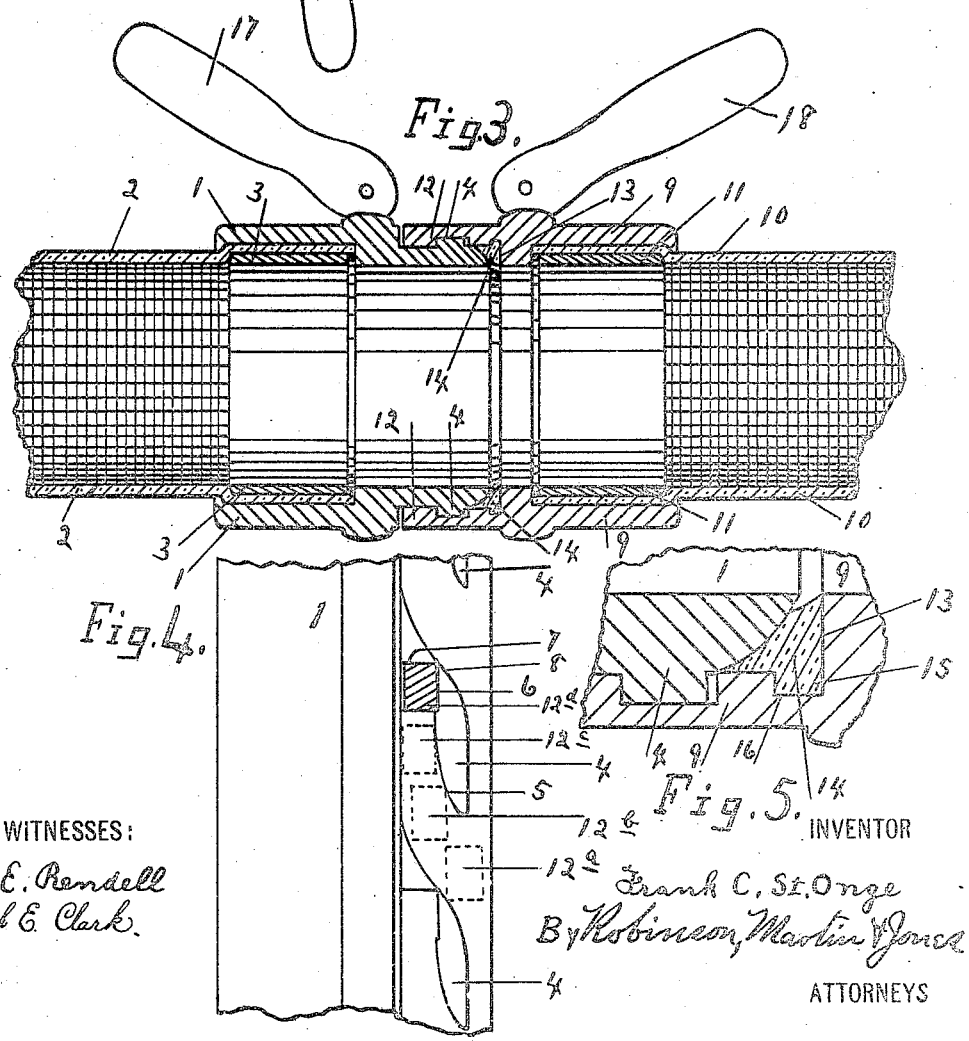
WITNESSES:
Geo. E. Rendell
Sarah E. Clark
INVENTOR
Frank C. St. Onge
By Robinson, Martin & Jones
ATTORNEYS

UNITED STATES PATENT OFFICE.

FRANK C. ST. ONGE, OF UTICA, NEW YORK, ASSIGNOR, BY DIRECT AND MESNE ASSIGNMENTS, TO ST. ONGE MANUFACTURING COMPANY, OF UTICA, NEW YORK.

HOSE-COUPLING.

No. 893,554.　　　Specification of Letters Patent.　　　Patented July 14, 1908.

Application filed March 29, 1907. Serial No. 365,213.

*To all whom it may concern:*

Be it known that I, FRANK C. ST. ONGE, of Utica, in the county of Oneida and State of New York, have invented certain new and useful Improvements in Hose-Couplings; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my present invention is to provide a hose coupling, simple in construction, with few parts, and which can be coupled and uncoupled quickly.

Figure 1 is a perspective view of the male member of the hose coupling. Fig. 2 is a perspective view of the female member of the hose coupling. Fig. 3 is a longitudinal sectional view of the hose coupling coupled. Fig. 4 is a profile view of the locking device showing the lugs in sundry positions with regard to the projections on the other member. Fig. 5 is a longitudinal sectional view on an enlarged scale of a portion of the hose coupling coupled.

Referring to the reference letters and figures in a more particular description, 1 is the body of the male member of the hose coupling, to which the hose 2 is attached by the usual means of an expanded ring 3. Upon the external face of the free end of the body 1 is provided a set of camming projections 4, each of which has a drawing cam face 5 and a retaining depression 6, with a stop wall 7 and a throw out cam face 8 at the rear end. 9 is the body of the female member of the hose coupling, to which is attached the hose 10 with the usual expanded ring 11. On the internal face of the free end of the female member is provided a set of inwardly extending lugs 12 arranged and adapted to coöperate with the projections 4. In the body of the female member 9 there is provided a shoulder 13, between which and the opposing rounded end of the member 1 is interposed an elastic packing and locking ring 14, on which there is preferably provided an encircling rib 15 fitting into an internal circling groove 16 in the body 9 and adjacent to the shoulder 13. Preferably there is provided on the male member 1 and the female member 9 lever handles 17 and 18 respectively to assist in holding and operating the coupling.

In the operation of the coupling, the two members are brought together so that the lugs 12 enter the spaces between the ends of the projections 4 and the cam faces 8, as shown more particularly in Fig. 4, in which 12ᵃ represents this position of the lug 12. The two members are then brought closer together, and one member relatively rotated about the other member so that the lugs 12 strike on the cam faces 5, as shown in the position 12ᵇ in Fig. 4. As the members are further relatively rotated, the lugs 12 pass into the position as shown in 12ᶜ in Fig. 4, and thereafter into the position shown in Fig. 4 at 12ᵈ, in which position the lugs have been stopped by the stop walls 7 and have been drawn back into and retained in the depressions 6 by the expanding forces of the elastic packing ring 14 interposed between the shoulder 13 and the opposing rounded end of the male member. This ring has been gradually compressed as the two members have been gradually drawn together by means of the lugs 12 being forced along the drawing cam faces 5, as heretofore described. As the elastic ring 14 has been thus compressed between the two members, it has expanded somewhat inwardly. As the fluid is introduced into the hose under pressure, the pressure thereof tends to force the ring back again between and to expand between the shoulder 13, the body 9 and the opposing end of the male member, and thus to cause the lugs 12 to fit more tightly into the depressions 6 and pack the joint more tightly. The members are uncoupled by relatively rotating them in the opposite direction with which they are coupled.

In the first part of the uncoupling operation the lugs 12 ride out of the depressions 6 onto the general cam faces 5 of the projections 4. In this movement the elastic ring 14 is placed under somewhat greater tension momentarily. At the final end of the rotary movement, the lugs 12 engage with the throw-out cams 8 and the members are forced apart.

What I claim as new and desire to secure by Letters Patent is:

1. The combination in a hose coupling of a male member having an entering part having a rounded end and a set of external camming projections arranged around the periphery and having a retaining depression in the cam face and a stop wall at the end thereof and having an opposed throw-out cam face at the rear end, a female member arranged to receive the male member with its projections and having a set of inwardly extending lugs adapted to coöperate with the projections of the male member and having a shoulder opposed to the rounded end of the male member and an interposed beveled elastic packing and locking ring resting against said shoulder and the outer wall of the female member, substantially as set forth.

2. The combination in a hose coupling of a male member having an entering part having a rounded end and a set of external projections 4 arranged at intervals around the periphery of the entering part, said projections having cam faces 5 and cam face depressions 6 following the operative part of the cam face 5 and stop wall 7 and opposed throw-out cam face 8 on the end of the projection, the female member having in the receiving end internal spaced projections 12, shoulder 13 with groove 15 at the base thereof and beveled elastic packing ring 14 received in groove 15 and lying against the face of the shoulder 13 and arranged to be clamped in the angle between the shoulder 13 and the encircling wall of the female member on the one hand and the rounded entering end of the male member on the other hand, substantially as set forth.

In witness whereof, I have affixed my signature, in presence of two witnesses, this 26th day of March 1907.

FRANK C. ST. ONGE.

Witnesses:
GEO. E. RENDELL,
E. S. HESSE.